(12) United States Patent  
Carnevali

(10) Patent No.: US 9,180,925 B2  
(45) Date of Patent: Nov. 10, 2015

(54) MIRROR ADAPTER MOUNT

(76) Inventor: Jeffrey D. Carnevali, Seattle, WA (US)

( * ) Notice: Subject to any disclaimer, the term of this patent is extended or adjusted under 35 U.S.C. 154(b) by 0 days.

(21) Appl. No.: 12/462,263

(22) Filed: Jul. 31, 2009

(65) Prior Publication Data

US 2011/0024598 A1    Feb. 3, 2011

(51) Int. Cl.
   *B60R 1/06*    (2006.01)
   *B62J 29/00*   (2006.01)
   *B60R 1/02*    (2006.01)

(52) U.S. Cl.
   CPC . *B62J 29/00* (2013.01); *B60R 1/02* (2013.01); *B60R 1/06* (2013.01)

(58) Field of Classification Search
   CPC ............ B60Q 1/34; G02B 5/08; B60R 1/078; B60R 1/076; B60R 1/06; B60R 1/02; Y10S 248/90; B62J 29/00
   USPC ............... 248/482, 475.1, 476, 479, 481, 484
   See application file for complete search history.

(56) References Cited

U.S. PATENT DOCUMENTS

| | | | | |
|---|---|---|---|---|
| 516,910 | A * | 3/1894 | Bucherer | 248/480 |
| 1,399,461 | A * | 12/1921 | Childs | 248/482 |
| 1,934,223 | A * | 11/1933 | Booth | 248/482 |
| 1,973,847 | A * | 9/1934 | De Orlow et al. | 248/482 |
| 2,161,771 | A * | 6/1939 | Alexander | 343/712 |
| 3,096,061 | A * | 7/1963 | Bertell | 248/481 |
| 3,377,117 | A * | 4/1968 | Biscow | 359/549 |
| 3,977,645 | A * | 8/1976 | Deely | 248/484 |
| 3,995,945 | A * | 12/1976 | Addicks | 359/842 |
| 4,165,156 | A * | 8/1979 | O'Connell | 359/841 |
| 4,605,289 | A * | 8/1986 | Levine et al. | 359/842 |
| 4,995,712 | A * | 2/1991 | Mori | 359/840 |
| 5,073,019 | A * | 12/1991 | Ferreira do Espirito Santo | 359/872 |
| 5,845,885 | A * | 12/1998 | Carnevali | 248/181.1 |
| 6,905,234 | B2 * | 6/2005 | Zagrodnik et al. | 362/474 |
| 7,261,272 | B2 * | 8/2007 | Courbon | 248/475.1 |
| 7,780,298 | B2 * | 8/2010 | Greathouse | 359/842 |
| 2005/0237643 | A1 * | 10/2005 | Wu | 359/871 |
| 2006/0261239 | A1 * | 11/2006 | Courbon | 248/475.1 |
| 2007/0246633 | A1 * | 10/2007 | Carnevali | 248/544 |

* cited by examiner

*Primary Examiner* — Nkeisha Smith
(74) *Attorney, Agent, or Firm* — Charles J. Rupnick Attorney at Law

(57) ABSTRACT

A novel mirror adapter mount for mounting between a handlebar mirror mount and a mirror normally secured thereto. According to one embodiment, the mirror adapter mount having a substantially rigid bracket with a first and second spaced-apart apertures each structured to receive a threaded shaft of the mirror, a threaded coupler having a shaft having a threaded portion thereof that is sized to be received through the first aperture in the bracket; a first securing means for securing the threaded portion of the shaft of the coupler to the handlebar mirror mount with a portion of the bracket secured there between; and a second securing means for securing the threaded shaft of the mirror to the second aperture of the bracket.

6 Claims, 12 Drawing Sheets

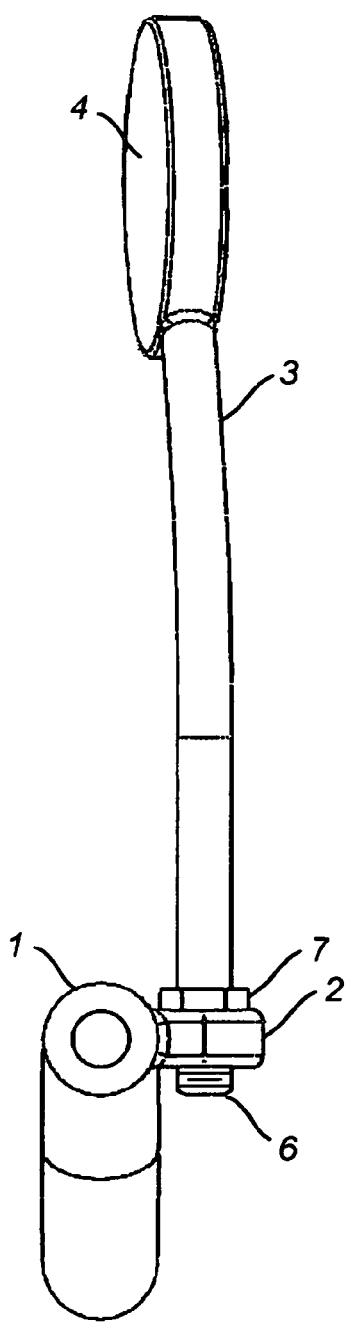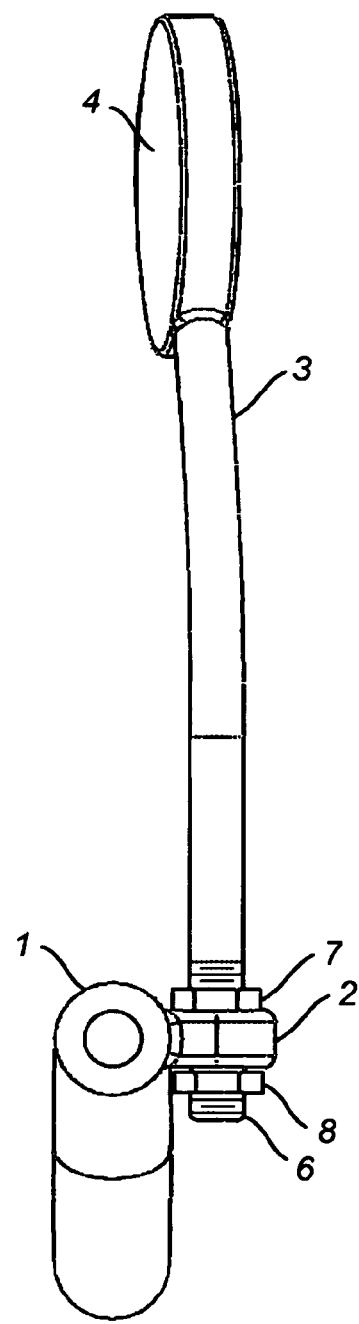
Fig. 2
(Prior Art)
Fig. 3
(Prior Art)

MIRROR ADAPTER MOUNT

FIELD OF THE INVENTION

The present invention relates generally to means for providing mounting space on motorcycle handlebars, and in particular means for expanding pre-existing mounting space.

BACKGROUND OF THE INVENTION

Many after-market accessories are available for mounting on the handlebars of motorcycles. However, motorcycle manufacturers leave little or no real estate on the handlebars for the mounting of after-market accessories. Therefore, innovative ways of maximizing utilization of the available real estate are required.

SUMMARY OF THE INVENTION

The present invention is a novel mounting device, formed of a pivot connector having a connector base and a coupler interface with a pivot joint therebetween; a means for adjusting a rotational stiffness of the pivot joint; a ball component formed on the coupler interface opposite from the pivot joint; and a coupler adapted for securing the connector base to a mirror mount of a handlebar.

According to one aspect of the novel mounting device, a substantially rigid bracket is provided having first and second spaced-apart apertures each structured to receive a threaded shaft of a mirror. The coupler has a threaded shaft sized for being received through the first aperture of the bracket. Means are provided for securing the threaded portion of the shaft of the coupler to the handlebar mirror mount with a portion of the bracket secured therebetween.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 illustrates a wrench interface on the mirror for securing to the handlebar;

FIG. 3 illustrates a nut for securing the mirror to the handlebar;

DETAILED DESCRIPTION OF PREFERRED EMBODIMENT

In the Figures, like numerals indicate like elements.

Figure 1:
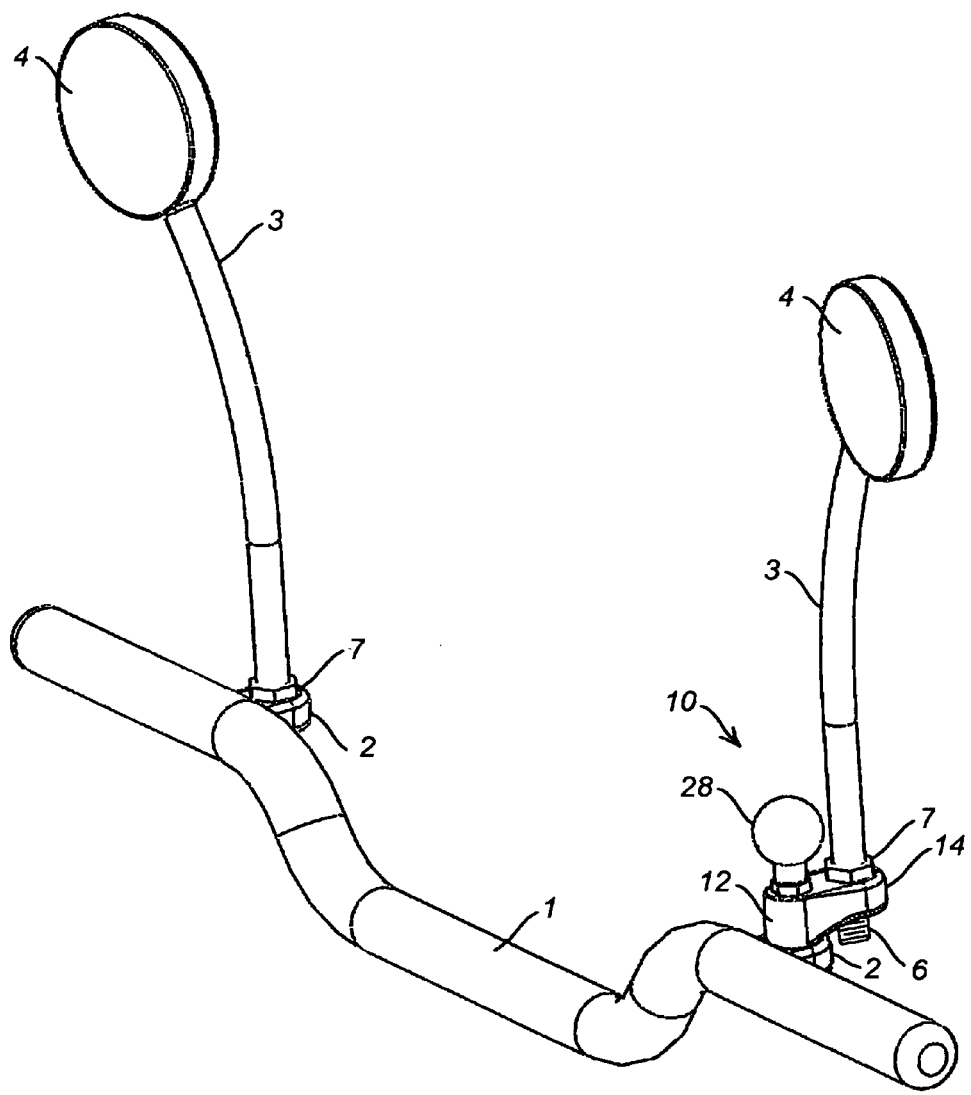
FIG. 1 illustrates a pair of rear view mirrors mounted on a handlebar.
Figure 4:
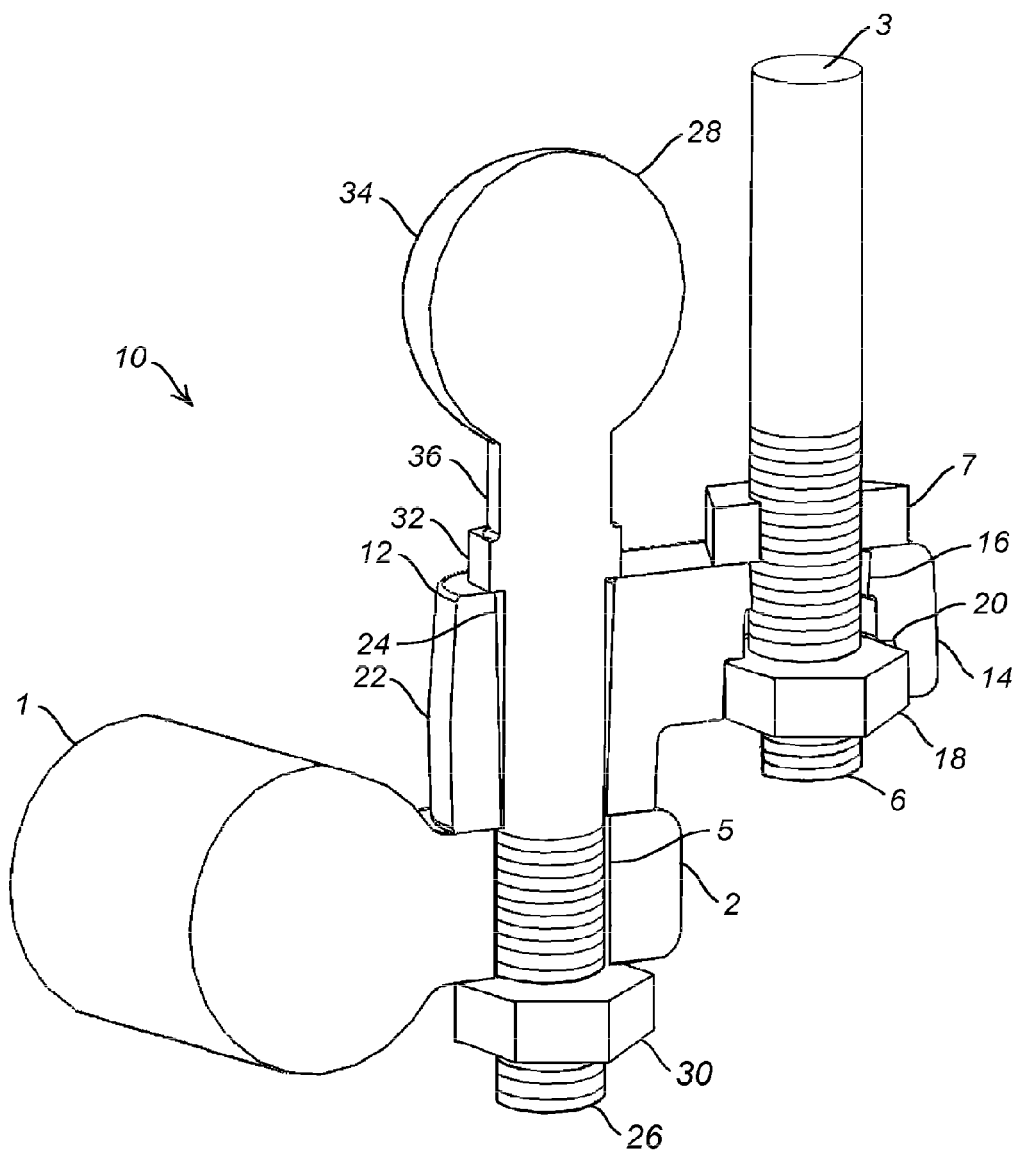
FIG. 4 illustrates a novel mirror adapter mount coupled between the mirror and handlebar.

FIG. 1 illustrates a handlebar 1 having a pair of mirror mount receivers 2 each formed as an eye sized to receive therethrough a mirror mounting stem 3 supporting a rear view mirror 4. As illustrated in FIG. 4, mirror mount receiver eye 2 is formed with an aperture 5 sized to receive mounting stem 3 supporting mirror 4. For example, aperture 5 is threaded to mate with a thread 6 formed on mounting stem 3 supporting mirror 4. As more clearly shown in FIG. 2, mirror mounting stem 3 may include a wrench interface 7, such as a hex, for tightening mounting stem 3 with mirror mount receiver eye 2. Alternatively, as illustrated in FIG. 3, instead of a matching thread, aperture 5 of mirror mount receiver eye 2 is a clearance hole for thread 6 of mirror mounting stem 3, and a nut 8 engages thread 6 on mounting stem 3 opposite from wrench interface 7. Also, wrench interface 7 may be replaced by a nut 9 that engages thread 6 above mirror mount receiver eye 2 for securing mounting stem 3 with mirror 4.

A novel mirror adapter mount 10 is installed on handlebar 1 at one of the pair of mirror receivers 2. Novel mirror adapter mount 10 is mounted between mirror mount receiver eye 2 and mirror 4. Mirror adapter mount 10 is a rigid bracket 12 adapted to mate with mirror mount receiver eye 2 with a mirror mount receiver eye 14 adapted to receive and secure mounting stem 3 of mirror 4. For example, in FIG. 1 receiver eye 14 of mirror adapter mount 10 is threaded to mate with thread 6 formed on mounting stem 3 supporting mirror 4.

FIG. 4 illustrates aperture 5 of mirror mount receiver eye 2 as a smooth bore clearance hole for thread 6 of mirror mounting stem 3. Receiver eye 14 of bracket 12 includes an aperture 16 for thread 6 of mirror mounting stem 3 of mirror 4. For example, aperture 16 is a smooth bore clearance hole similar to aperture 5 of mirror mount receiver eye 2, and a nut 18 engages thread 6 for securing mirror mounting stem 3. Optionally, receiver eye 14 includes a nut pocket 20 sized to receive nut 18 and resist turning when thread 6 of mirror mounting stem 3 is turned.

Receiver eye 14 is cantilevered from a hub 22 of bracket 12 that is adapted to mate with mirror mount receiver eye 2 of handlebar 1. For example, hub 22 is centered on a clearance hole 24 sized to receive therethrough a stem 26 of a connector 28. When mirror mount receiver eye 2 has a threaded hole 5 for thread 6 of mirror mounting stem 3, stem 26 of connector 28 is a threaded shaft matched to threaded hole 5. Else, when mirror mount receiver eye 2 has a smooth bore clearance hole 5 for thread 6 of mirror mounting stem 3, stem 26 of connector 28 is a threaded shaft sized to slip through clearance hole 5. A nut 30 engages threaded stem 26 for securing connector 28.

According to one embodiment, connector 28 has a wrench interface 32, such as a hex or socket, for tightening mirror mounting stem 3 with mirror mount receiver eye 2. Connector 28 includes a part-spherical coupler component 34 that is radially resiliently compressible because it is molded of a resiliently deformable neoprene rubber. Part-spherical coupler component 34 is spaced away from hub 22 of bracket 12 on a slender neck portion 36 of stem 26 for use as the ball component of a rotationally and spherically adjustable ball-and-socket device, such as but not limited to the universally positionable mounting device disclosed by the inventor of the present invention in U.S. Pat. No. 5,845,885, which is incorporated herein by reference.

Figure 5:
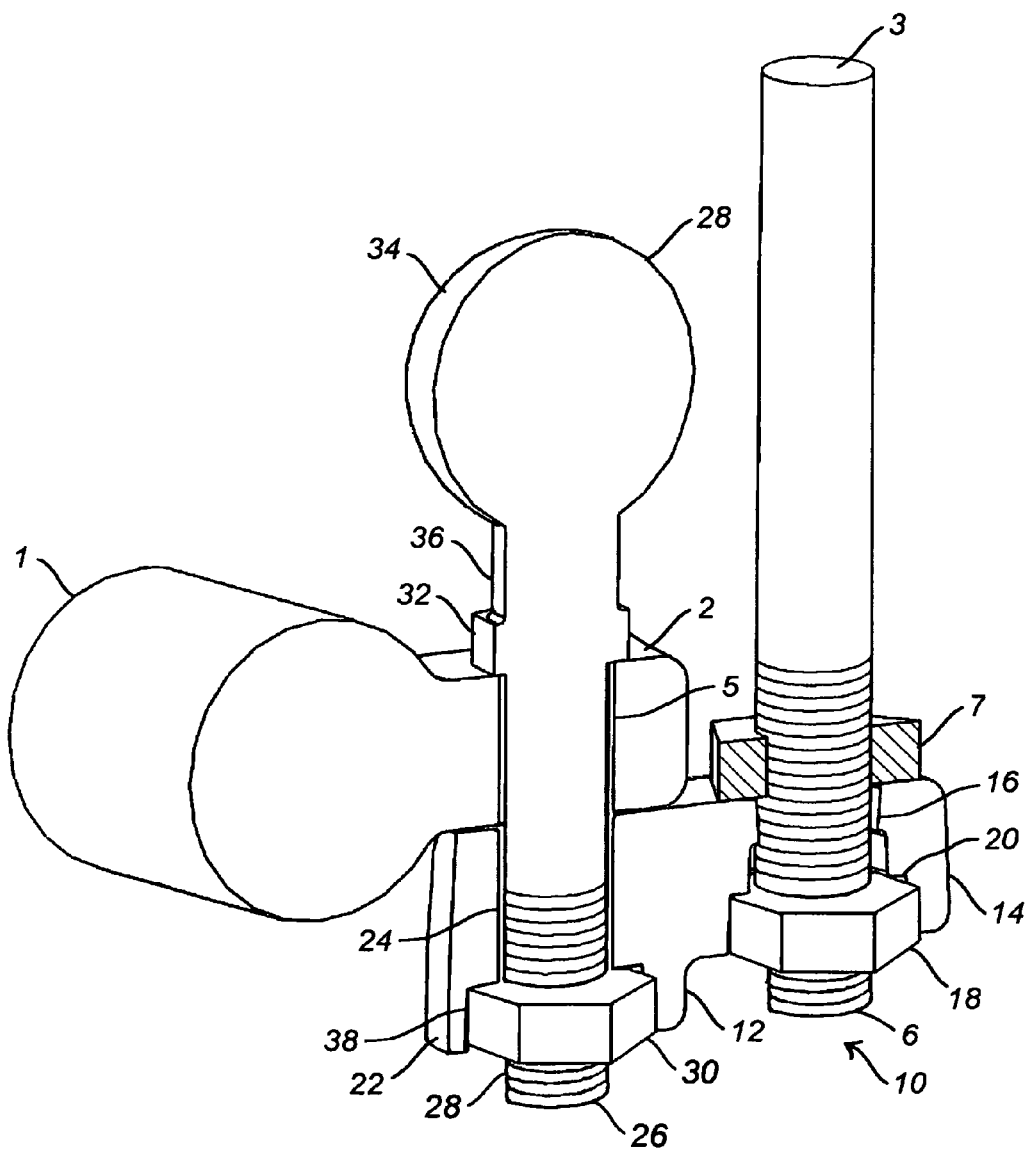
FIG. 5 illustrates one alternative embodiment of a bracket portion of the novel mirror adapter mount.

FIG. 5 illustrates one alternative embodiment of bracket 12 wherein hub 22 is formed with an optional nut pocket 38 sized to receive thereinto nut 30 and resist its turning when threaded stem 26 of connector 28 is turned in clearance aperture 5 for mounting mirror adapter mount 10 to mirror mount receiver eye 2.

Figure 6:
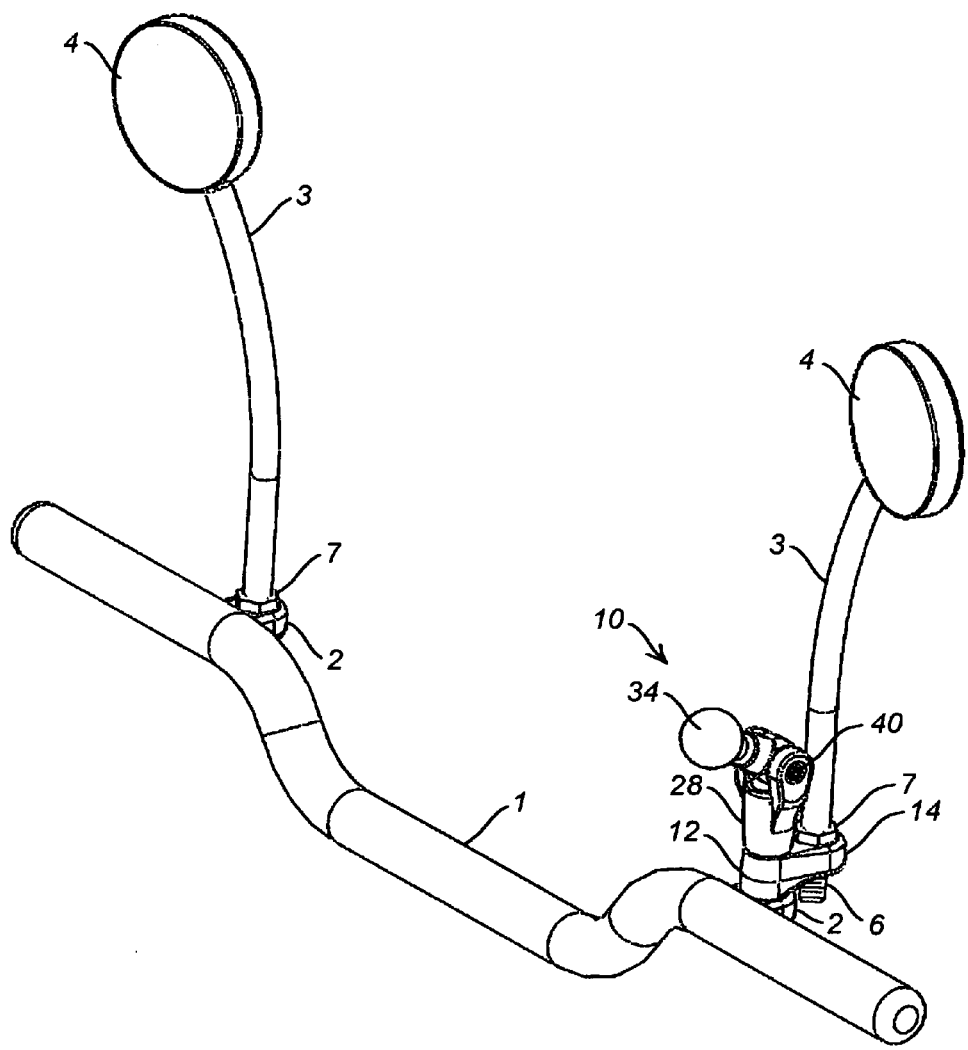
FIG. 6 illustrates a pivot joint between the bracket and a ball component of the novel mirror adapter mount.

FIG. 6 illustrates connector 28 of mounting mirror adapter mount 10 having a pivot joint 40 between coupler component 34 and bracket 12. Pivot joint 40 permits coupler component 34 to be pivotally rotated into different positions relative to mounting stem 3 with rear view mirror 4.

Figure 7:
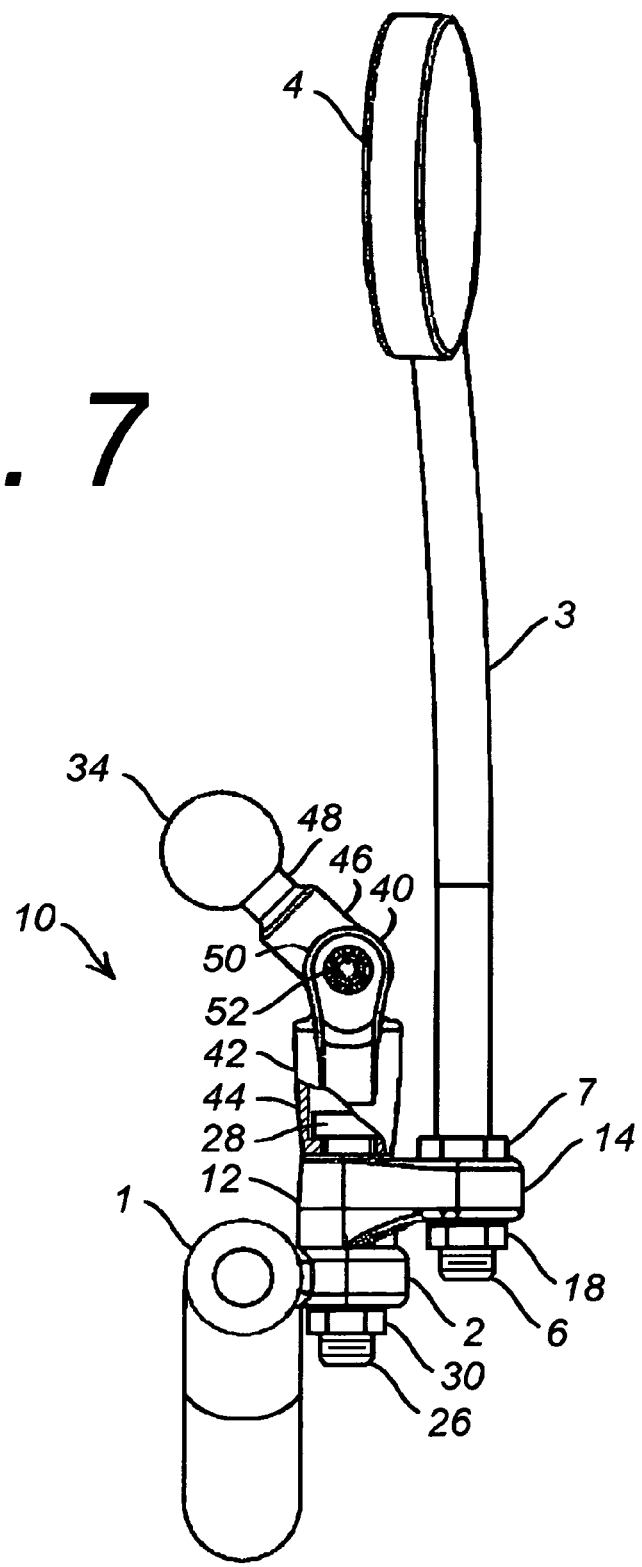
FIG. 7 illustrates the pivot joint between the bracket and a ball component of the novel mirror adapter mount.

FIG. 7 also illustrates connector 28 of mounting mirror adapter mount 10 having pivot joint 40 between coupler component 34 and bracket 12. For example, pivot joint 40 is embodied in a pivot arm 42 between coupler component 34 and bracket 12. According to one embodiment, pivot arm 42 includes a connector base 44 coupleable to bracket 12 and a coupler interface 46 with pivot joint 40 in between. Coupler interface 46 includes coupler component 34 formed on a slender neck member 48 opposite from pivot joint 40. Pivot joint 40 is formed of a yoke 50 with a pivot pin 52 through neck member 48 opposite from coupler component 34.

Pivot arm 42 is optionally connected directly to bracket 12 through connector base 44. However, here connector 28 is optionally inserted through connector base 44 for coupling both bracket 12 and pivot arm 42 to mirror mount receiver eye 2.

Figure 8:
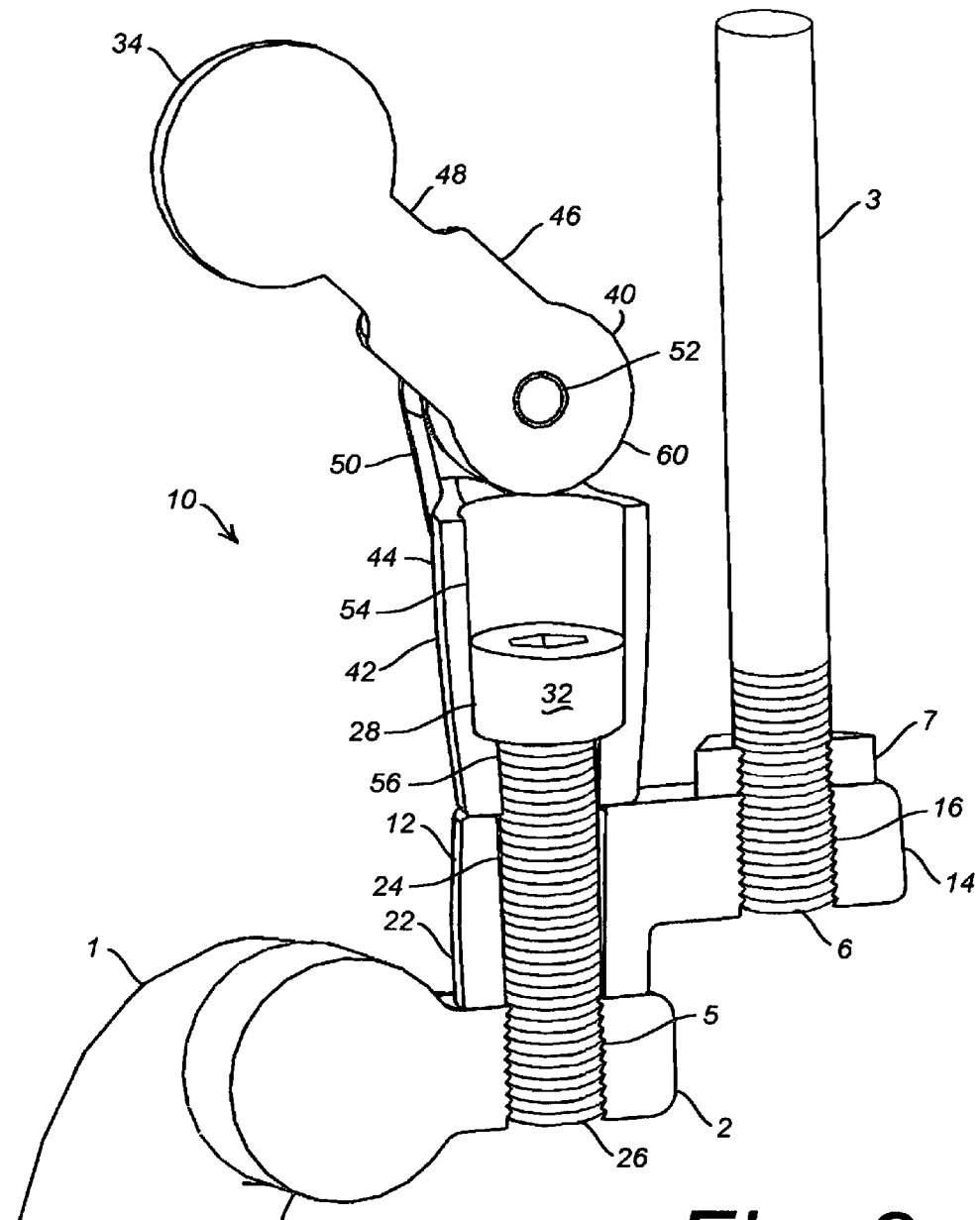
FIG. 8 is a cross-section of the novel mirror adapter mount having the pivot joint.

FIG. 8 illustrates an option of connector 28 being inserted through connector base 44 for connecting both bracket 12 and pivot arm 42 to mirror mount receiver eye 2. For example, connector base 44 is formed with a counter-bore 54 beneath yoke 50, and a clearance hole 56 for connector 28. Here, aperture 5 of mirror mount receiver eye 2 is threaded to receive thread 6 formed on mounting stem 3 with mirror 4. Accordingly, connector 28 is a machine screw having stem 26 threaded similarly to thread 6 so as to match threaded aperture 5. Threaded stem 26 of connector 28 passes through both clearance holes 56 and 24 and threadedly engages threaded aperture 5 to couple both connector base 44 of pivot arm 42 and bracket 12 to mirror mount receiver eye 2 of handlebar 1.

Receiver eye 14 of bracket 12 includes an aperture 16 for thread 6 of mirror mounting stem 3 of mirror 4. Accordingly, aperture 16 of receiver eye 14 is a threaded hole similar to threaded aperture 5 of mirror mount receiver eye 2, and thread 6 engages threaded aperture 16 of receiver eye 14 for securing mirror mounting stem 3 to receiver eye 14.

Figure 9:
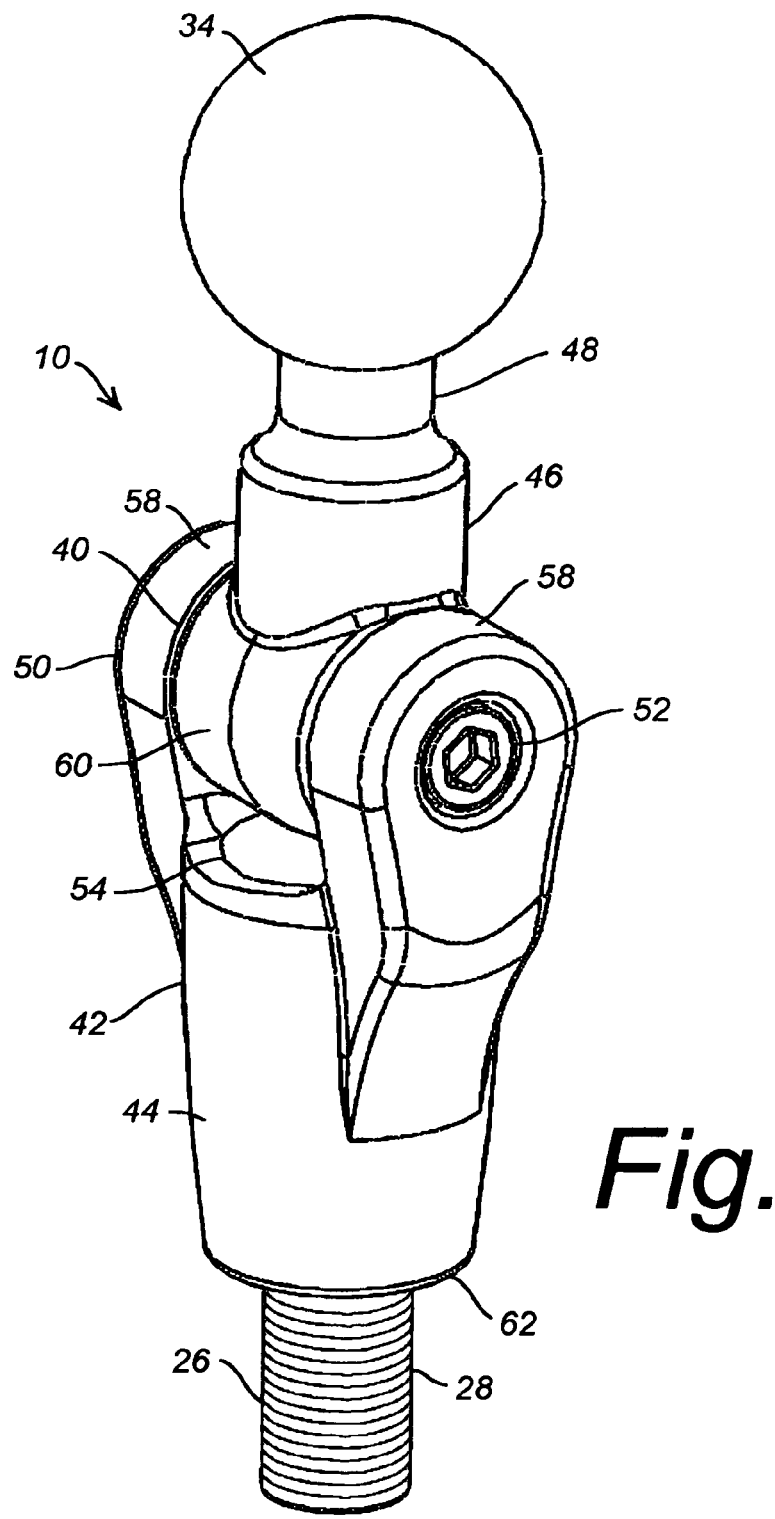
FIG. 9 illustrates the novel mounting mirror adapter mount having the pivot joint.

FIG. 9 illustrates connector 28 of mounting mirror adapter mount 10 having pivot arm 42. Yoke 50 of pivot joint 40 is formed as a pair of arms 58 extended above connector base 44. Coupler interface 46 includes a barrel hub 60 with coupler component 34 extended on neck member 48. Barrel hub 60 of coupler interface 46 is rotatable between arms 58 of yoke 50. Pivot pin 52 passes through both arms 58 of yoke 50 with barrel hub 60 in between.

Base 44 of pivot arm 42 is formed with a shoulder 62 for engaging and nesting against hub 22 of bracket 12 when connector 28 is installed into mirror mount receiver eye 2.

Figure 10:
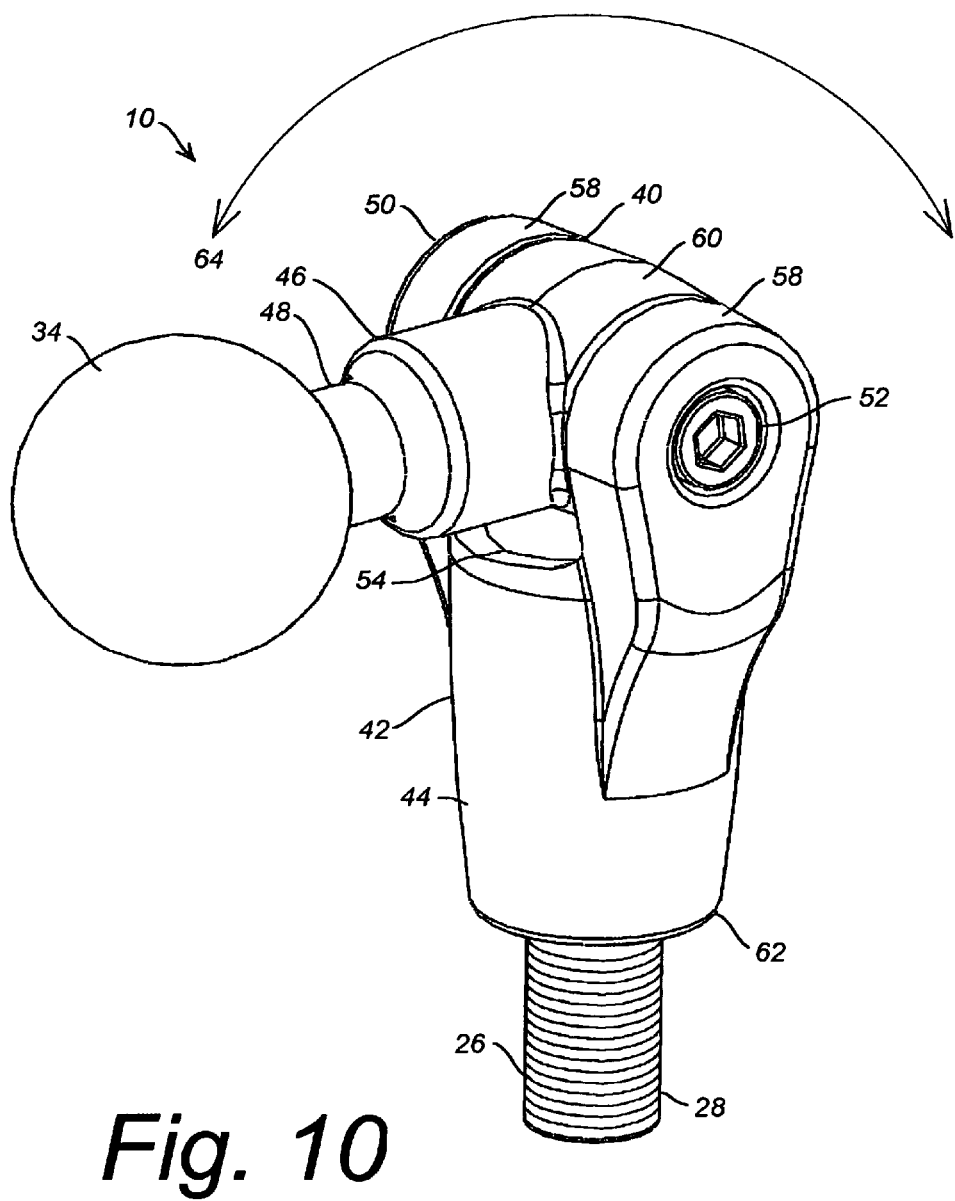
FIG. 10 illustrates a radial range of motion of the novel mounting mirror adapter mount through rotation of the pivot joint.

FIG. 10 illustrates a radial range of motion (arrow 64) of coupler component 34 of mounting mirror adapter mount 10 through rotation of pivot joint 40 between coupler interface 46 and connector base 44.

Figure 11:
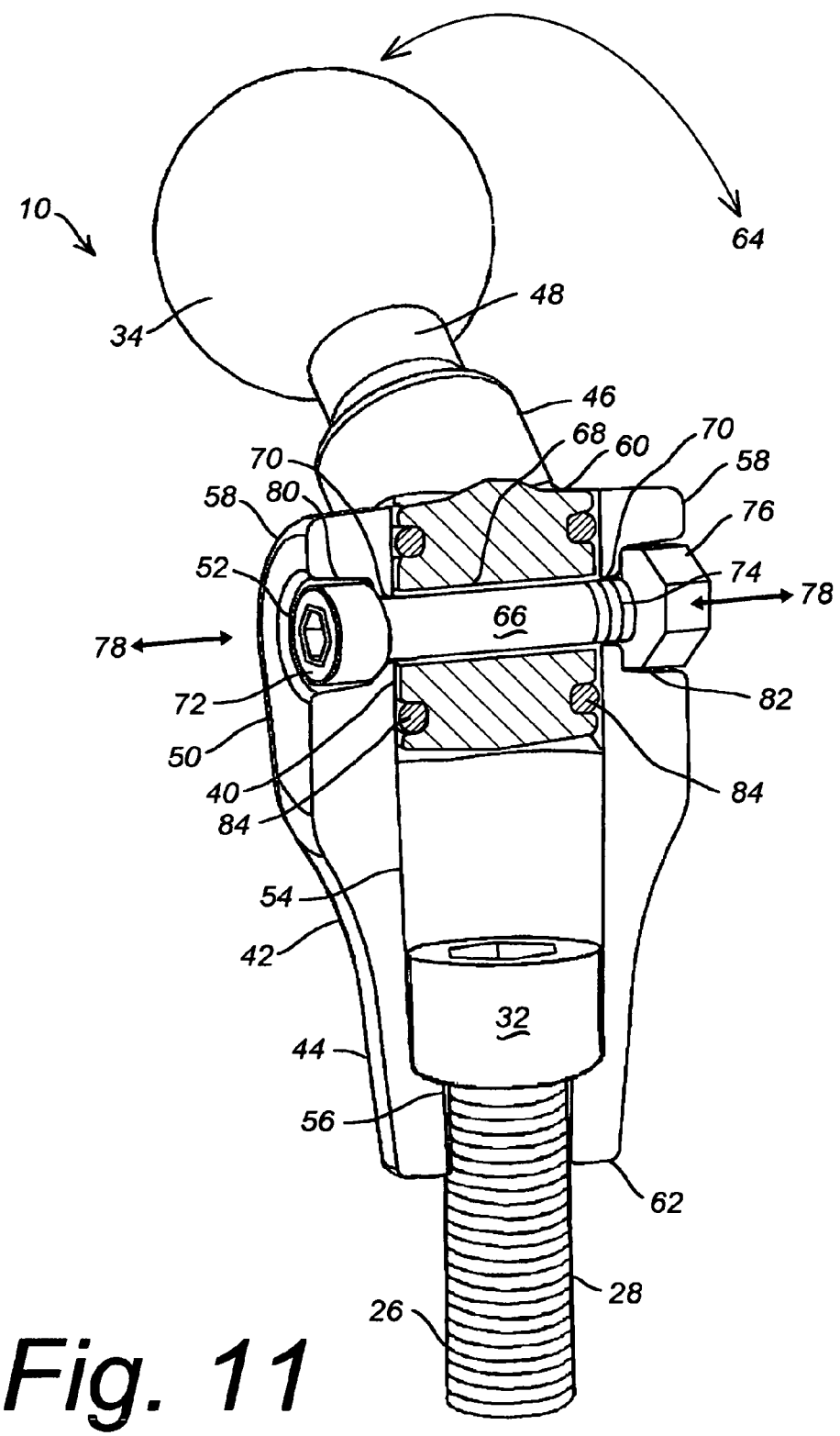
FIG. 11 illustrates one embodiment of the pivot joint.

FIG. 11 is a cross-section of pivot arm 42. According to one embodiment, pivot joint 40 is adjustable by means of pivot pin 52 operating between arms 58 of yoke 50. For example, pivot pin 52 includes a cylindrical shaft 66 passing through a central bore 68 through barrel hub 60 of coupler interface 46 and apertures 70 in each arm 58 of yoke 50.

Pivot pin 52 has a head 72 at one end of shaft 66 and threads 74 at the other end. A nut 76 is coupled to threads 70 of pivot pin 52. Alternate tightening and loosening of pivot pin 52 tightens and loosens (arrows 78) pivot joint 40. Arms 58 of yoke 50 are slightly flexible such that tightening of pivot pin 52 flexes yoke 50 and compresses arms 58 inwardly about barrel hub 60 of coupler interface 46. Compression of yoke 50 about barrel hub 60 stiffens pivot joint 40 against rotation. Loosening of pivot pin 52 relaxes yoke 50 and decompresses arms 58 outwardly from barrel hub 60, which relaxes pivot joint 40 and permits coupler interface 46 to rotate. Adjustment of pivot joint 40 is accomplished by loosening pivot pin 52, rotating coupler component 34 is to a desired angular arrangement within radial range of motion (arrow 64), and re-tightening pivot pin 52 to secure the desired angular arrangement. According to one embodiment, head 72 of pivot pin 52 is recessed in a counter bore 80 in one arm 58 of yoke 50, and nut 76 is seated in a nut pocket 82 in opposite one arm 58.

According to one embodiment, a resiliently compressible elastomeric interface 84 is seated between barrel hub 60 of coupler interface 46 and one or both arms 58 of yoke 50 for maintaining stiffness of pivot joint 40 when desired angular arrangement of coupler component 34 is achieved. For example, elastomeric interfaces 84 are o-rings which, when formed of a rubber, neoprene or another elastomeric material, have a high coefficient of friction. The high coefficient of friction of elastomeric interfaces 84 permit secured pivot joint 40 to be adjusted to and maintain a new orientation, without loosening and subsequent tightening pivot pin 52 to secure the desired angular arrangement as was required in prior art devices.

Figure 12:
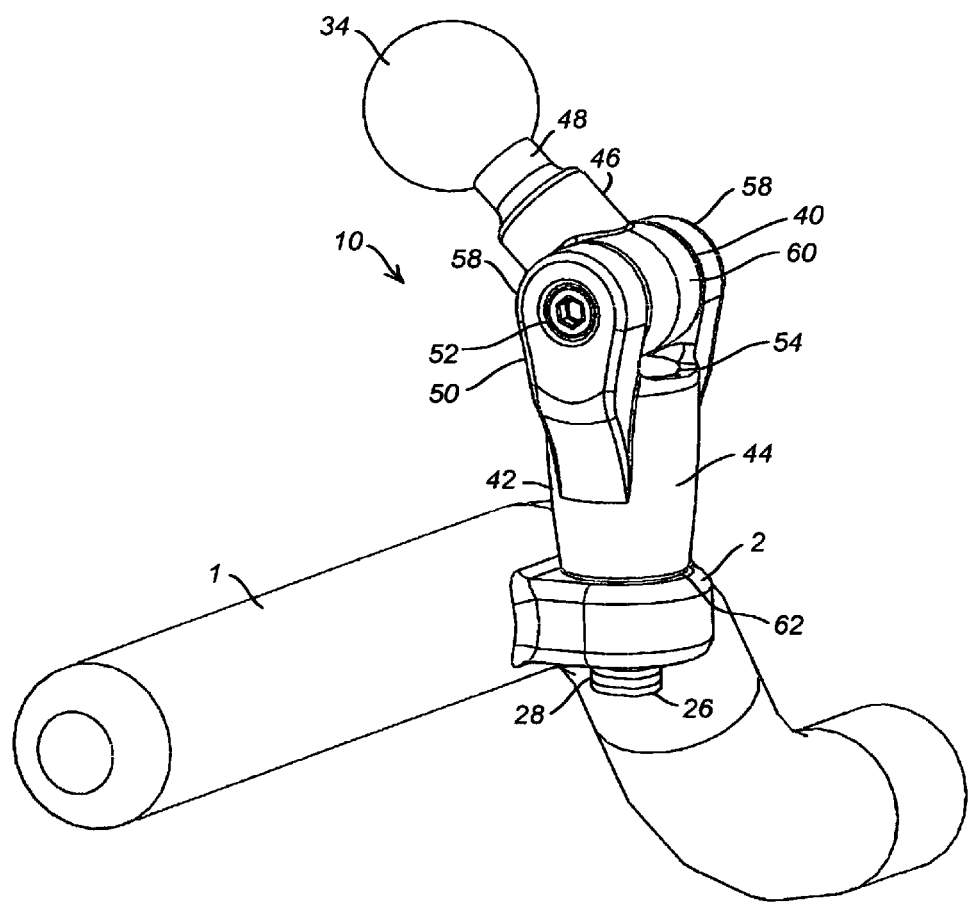
FIG. 12 illustrates a pivot connector mounted directly to the handlebar, with the novel mirror adapter mount eliminated from therebetween.

FIG. 12 illustrates connector 28 coupling pivot arm 42 directly to aperture 5 of eye mirror mount 2, with bracket 12 eliminated from therebetween. For example, connector 28 is seated in counter-bore 54 beneath yoke 50 of connector base 44 with shoulder 62 for engaging and nesting against mirror mount 2. Threaded stem 26 is coupled into threaded aperture 5 for securing connector 28 to eye mirror mount 2. Else, when aperture 5 of eye mirror mount 2 is clearance hole for mounting stem 3 supporting rear view mirror 4, nut 30 engages threaded stem 26 for securing connector 28. Accordingly, pivot arm 42 mounts coupler component 34 directly to mirror mount receiver eye 2 of handlebar 1.

Figure 13:
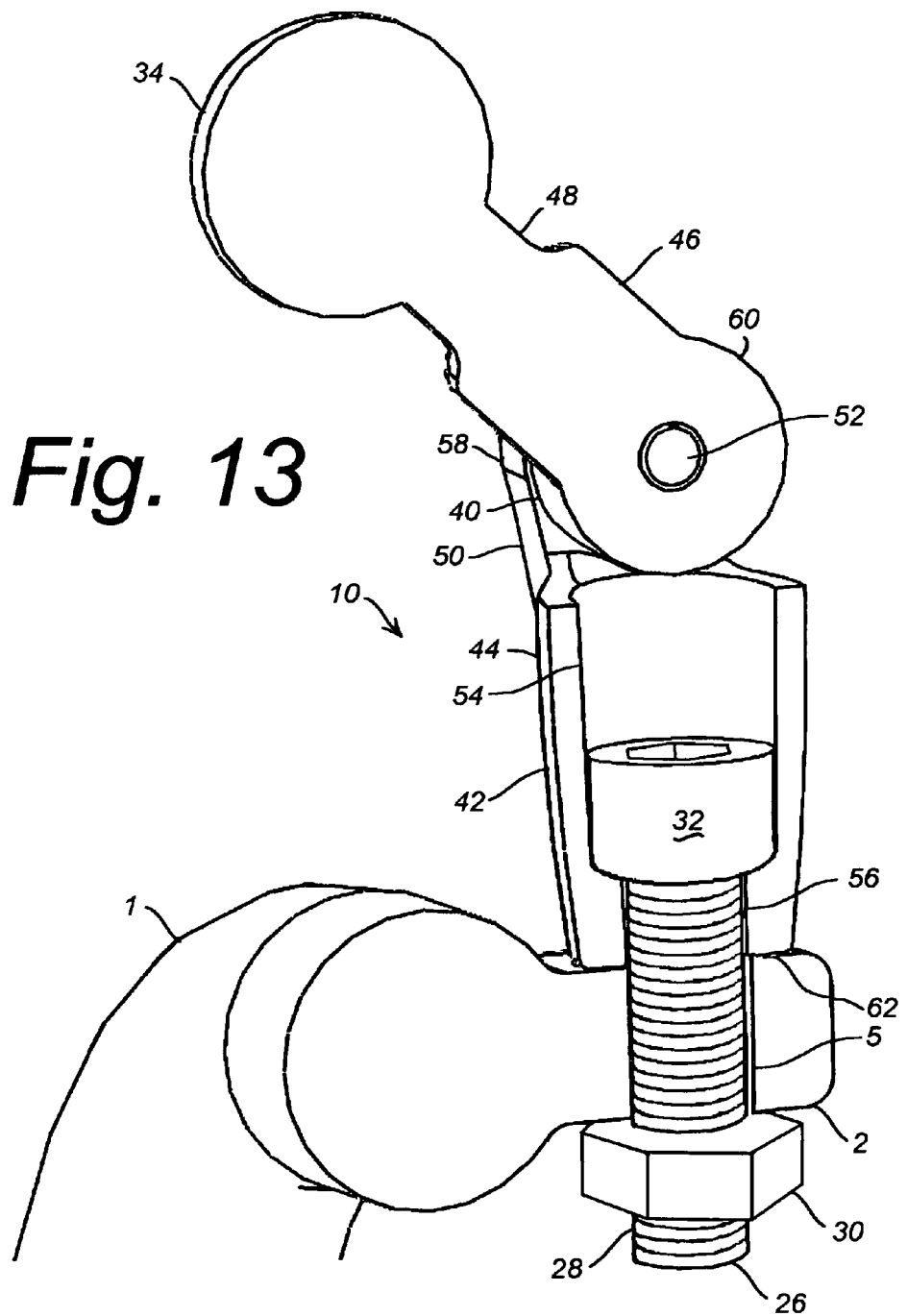
FIG. 13 illustrates a pivot connector mounted directly to the handlebar.

FIG. 13 is a cross-section of pivot arm 42 coupled directly to mirror mount receiver eye 2 by connector 28. Here, aperture 5 is a clearance for connector stem 26, and nut 30 secures connector 28 to mirror mount receiver eye 2 of handlebar 1.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A mirror adapter mount for mounting between a mirror mount receiver on a handlebar and a mirror mounting stem normally secured thereto and supporting a mirror thereon, the mirror adapter mount comprising:

a substantially rigid bracket, comprising first and second substantially parallel and spaced-apart apertures formed therethrough and each structured to receive therethrough a threaded portion of a mirror mounting stem;

a threaded connector comprising a shaft comprising a threaded portion that is received through the first aperture in the bracket, the connector further comprising a coupler component adjacent to an end thereof substantially opposite of the threaded portion and adapted for securely receiving a mounting device thereon;

wherein the first aperture of the bracket further comprises a clearance aperture having the threaded portion of the shaft of the connector received therethrough, and wherein the second aperture of the bracket further comprises a clearance aperture having the threaded portion of the mirror mounting stem received therethrough;

a first nut having threads matched to the threaded portion of the shaft of the connector, whereby the threaded portion of the shaft of the connector is secured to the mirror mount receiver of the handlebar with a portion of the bracket secured there between with the coupler component disposed externally of the bracket when the first nut is threaded to the threaded portion of the shaft of the connector; and a second nut threaded to the threaded portion of the mirror mounting stem, whereby the threaded portion of the mirror mounting stem is secured to the second aperture of the bracket.

2. The mirror adapter mount of claim 1, wherein the coupler component of the connector further comprises a universal coupler.

3. A method of adapting a mount for positioning on a handlebar between a mirror mount receiver having an aperture and a mirror having a mirror mounting stem with a partially threaded shaft that is normally secured to the aperture of the mirror mount receiver and supporting a mirror thereon, the method comprising:

in a substantially rigid bracket, providing first and second substantially parallel and spaced-apart apertures extended therethrough, wherein each of the first and second apertures is structured to receive therethrough the threaded shaft of the mirror mounting stem supporting the mirror thereon;

providing a threaded connector comprising a shaft having a threaded portion, and a coupler component positioned on the shaft;

extending the threaded portion of the shaft of the threaded connector through the first aperture in the bracket, and positioning the coupler component externally of the bracket in a position for securely receiving a mounting device thereon;

threadedly securing the threaded portion of the shaft of the connector to the aperture of the mirror mount receiver on the handlebar having removed therefrom the threaded shaft of the mirror mounting stem; and threadedly securing the threaded shaft of the mirror mounting stem of the mirror to the second aperture in the bracket, and wherein threadedly securing the threaded portion of the shaft of the connector to the aperture of the mirror mount receiver on the handlebar further comprises threadedly engaging a threaded engaging means with the threaded portion of the shaft of the connector with the aperture of the mirror mount receiver on the handlebar having removed therefrom the threaded shaft of the mirror mounting stem normally secured thereto.

4. The method of claim 3, wherein the aperture of the mirror mount receiver on the handlebar comprises a threaded bore matched to the threaded shaft of the mirror mounting stem of the mirror;

the method further comprising: from the threaded aperture of the mirror mount receiver on the handlebar, removing the threaded shaft of the mirror mounting stem normally secured thereto;

positioning the bracket adjacent to the mirror mount receiver on the handlebar with the first aperture in the bracket adjacent to the threaded aperture of the mirror mount receiver on the handlebar and substantially aligned therewith;

inserting the shaft of the threaded connector through the first aperture in the bracket; and securely threadedly engaging the threaded portion of the shaft of the threaded connector with threaded aperture of the mirror mount receiver on the handlebar, whereby the threaded connector is secured relative to both the bracket and the mirror mount receiver on the handlebar; and threadedly securing the threaded shaft of the mirror mounting stem of the mirror to the second aperture of the bracket.

5. The method of claim 3, wherein, the aperture of the mirror mount receiver on the handlebar comprises a smooth bore for receiving therethrough the threaded shaft of the mirror mounting stem of the mirror;

the method further comprising:

from the smooth bore of the aperture of the mirror mount receiver on the handlebar, removing the threaded shaft of the mirror mounting stem normally secured thereto;

slidingly receiving the threaded portion of the shaft of the threaded connector through the smooth bore of the aperture of the mirror mount receiver on the handlebar; and wherein threadedly securing the threaded portion of the shaft of the connector relative to the aperture of the mirror mount receiver on the handlebar further comprises inserting the threaded portion of the shaft of the threaded connector through both the first aperture in the bracket and the smooth bore aperture of the mirror mount receiver on the handlebar, and extending a portion of threaded portion of the shaft of the threaded connector through the aperture of the mirror mount receiver on the handlebar, and subsequently securing a nut onto the extended portion of threaded portion of the shaft of the threaded connector.

6. The method of claim 5, wherein securing the threaded shaft of the mirror mounting stem to the second aperture of the bracket further comprises extending a portion of threaded portion of the shaft of the mirror mounting stem through the second aperture of the bracket, and subsequently securing a nut onto the extended portion of threaded portion of the shaft of the mirror mounting stem.

* * * * *